May 25, 1937.  C. T. JACOBS  2,081,747
MOTOR VEHICLE CONTROL DEVICE
Filed Feb. 2, 1935  2 Sheets-Sheet 1

INVENTOR:-
Charles T. Jacobs

May 25, 1937.                C. T. JACOBS                2,081,747
MOTOR VEHICLE CONTROL DEVICE
Filed Feb. 2, 1935          2 Sheets-Sheet 2

INVENTOR.
Charles T. Jacobs.

Patented May 25, 1937

2,081,747

UNITED STATES PATENT OFFICE 2,081,747

MOTOR VEHICLE CONTROL DEVICE

Charles T. Jacobs, New Providence Township, Union County, N. J.

Application February 2, 1935, Serial No. 4,690

20 Claims. (Cl. 192—.01)

This invention relates to motor vehicles, and more particularly to operation control means and methods therefor.

It is a broad object of the instant invention to provide improved means and methods for controlling the operation of a motor vehicle.

The instant application, similar to my copending application Serial No. 742,211, filed August 31, 1934, which has since eventuated into Patent No. 2,051,606, dated August 18, 1936, has particular reference to the device known in the art as the automatic clutch. In that application I disclosed a variety of control means which rendered the automatic clutch operative for clutch disengagement in response to the joint performance of two manipulations: de-acceleration and a manipulation of the selective transmission control, or gear shift lever; this avoided clutch disengagement in response to mere de-acceleration, which is so frequently effected at times when it is desired that the clutch remain engaged, while not interfering with the action of the automatic clutch when the transmission was to be readjusted and clutch disengagement therefore desired.

It is an object of the instant invention to provide an automatic clutch system operative to produce such a result; an allied object is to provide means for causing the automatic clutch to operate in the manner outlined.

In the operation of conventional automatic clutch systems, and of systems according to my prior application assuming that the appropriate manipulation of the transmission control is being effected throughout the process of de-acceleration, clutch disengagement does not begin until de-acceleration is completed—e. g., until the accelerator pedal has been brought to a position which causes only the normal minimum of fuel to be supplied to the motor. Accordingly the clutch remains engaged while the motor is tending to slow down, and the vehicle may be appreciably slowed by the braking action of the motor before clutch disengagement actually occurs. Since transmission readjustment, during which automatic clutch action to disengage the clutch is relied on, is most often effected in the process of speeding up the vehicle, the slowing-up action just mentioned is an undesirable operational characteristic of the automatic clutch.

It is an important object of the instant invention to provide an automatic clutch system operative for clutch disengagement at an early instant in the process of de-acceleration.

It is a further object to provide such a system operative for clutch disengagement at an early instant in de-acceleration, but only when such de-acceleration is effected for the purpose of or incidentally to transmission readjustment.

It is a still further object to provide such a system operative for clutch disengagement at an early instant in de-acceleration, but only when such de-acceleration is accompanied by a manipulation instinctively or with great facility performed as an incident to transmission readjustment.

Other and allied objects will more fully appear from the following description and the appended claims.

In the detailed description of my invention hereinafter set forth, reference is had to the accompanying drawings, of which:—

Figures 1, 1A:
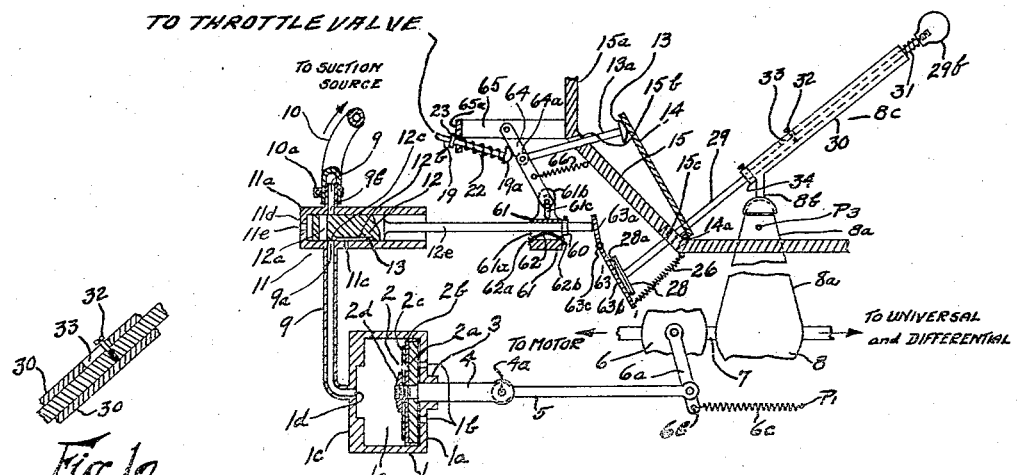
Figure 1 is a generally cross-sectional view of a portion of a motor vehicle equipped with an embodiment of my invention, taken vertically through and longitudinally of the vehicle.
Figure 1a is an enlarged cross-sectional view of a detail of Figure 1.
Figure 2:
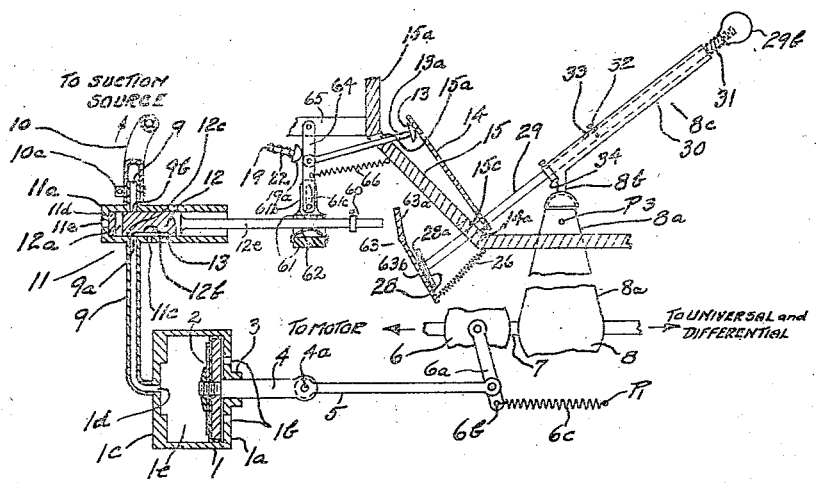
Figure 2 is a view identical with Figure 1, excepting that it illustrates the apparatus following and during the continuance of a depression of the accelerator pedal 13.
Figure 3:
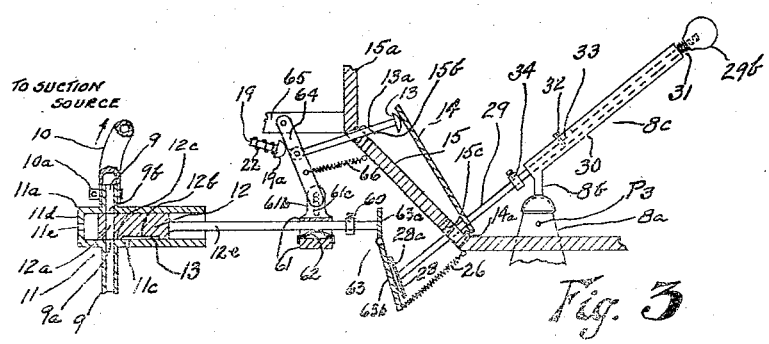
Figure 4:
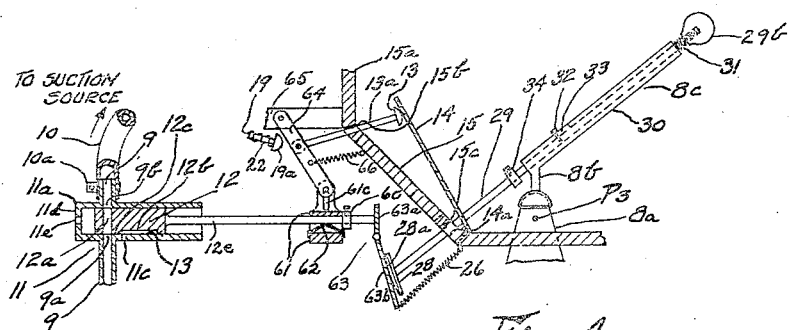
Figure 5:
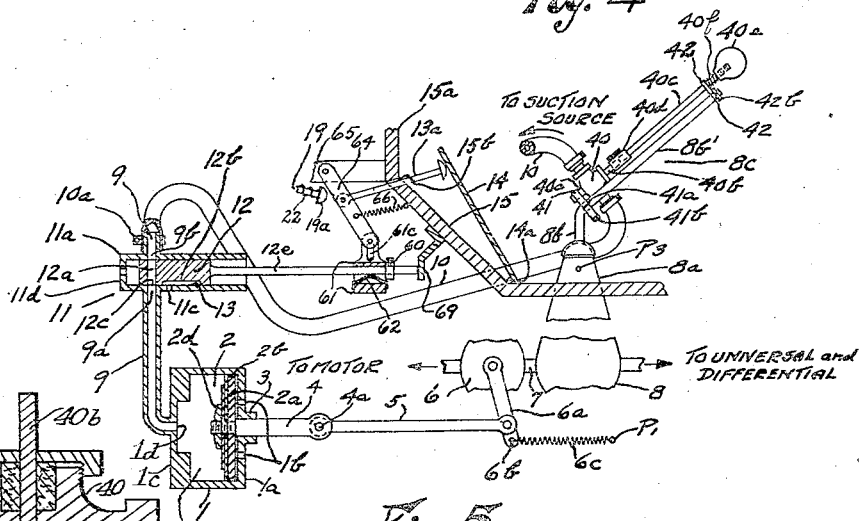
Figure 5A:
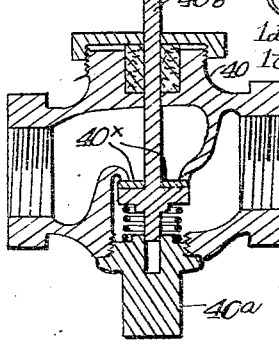

Figure 3 is a view identical with a portion of Figures 1 and 2, excepting that it illustrates the apparatus at an intermediate moment in the act of releasing the accelerator pedal 13, and the knob 29b at the top of the gear-shift lever in a depressed position;

Figure 4 is a view identical with Figure 3, excepting that it illustrates the apparatus with the accelerator pedal 13 fully released, and with the knob 29b still depressed;

Figure 5 is a view generally similar to Figure 1, but illustrating an alternative embodiment of my invention; and Figure 5a illustrates in cross-section a typical construction of the valve 40 appearing in Figure 5.

Figure 1 may first be referred to for the understanding of the simple automatic clutch system with which my invention has been illustrated. While this figure also actually illustrates one embodiment of my invention, there will first be described only sufficient portions thereof to show conventional automatic clutch operation. It will be understood that these portions are shown to some extent schematically, and only in sufficient detail to illustrate the co-operation therewith of the various novel features of my invention; further that no attempt is made to show features of refinement and detail with which such conventional systems are frequently provided.

In Figure 1 the numeral 1 designates a generally closed cylinder in which may slide longitudinally the piston 2, the rear end 1a of the cylinder being provided with the central boss 3 in which may slide the piston rod 4. For purposes of the instant invention it may be assumed that atmospheric pressure prevails within the cylinder to the rear of the piston 2, and accordingly air vents 1b are shown in the rear cylinder end 1a. The piston 2 itself may be of any suitable form, having been illustrated as comprising the main disc 2a, the leather facing 2b in contact with the forward face and periphery of the disc 2a, the clamping washer 2c, and the clamping nut 2d securing the assembly to the piston rod 4. Pivotally secured to the piston rod extremity 4a is the clutch rod 5, which operatively connects the piston rod extremity with the clutch crank 6a near the extremity 6b of the latter. The clutch crank 6a forms a part of the schematically shown clutch 6, from which the drive shaft or other means 7 passes forwardly to the motor (not shown) and rearwardly through the schematically shown transmission 8 to the "universal", differential, and driving wheels (not shown).

With the piston 2 and the crank 6a in their rearward positions (as shown in Figure 1) the clutch 6 will be understood to be engaged; these parts are biased to such positions by any suitable means, a tension spring 6c having been illustrated between the crank extremity and a more rearward fixed point P₁. For moving the piston 2 against the force of the biasing means 6c to a position forward within the cylinder 1 and thus disengaging the clutch, suction is applied to the space within the cylinder 1 forward of the piston; this space may accordingly be termed the suction chamber, and is designated as 1e. Thus in the forward end 1c of the cylinder 1 is provided the aperture 1d connecting with the pipe 9, in which pipe is interposed the valve assembly 11 hereinafter detailedly described. A hose 10 is clamped as by clamp 10a to the top extremity of the pipe 9, and connects the same with a source of suction (not shown), which may for example be the intake manifold of the motor.

The function of the valve 11 is the control of the pressure conditions within the suction chamber 1e. The valve may illustratively comprise a cylindrical casing 11a and a generally cylindrical plunger 12 slidably fitting therewithin. The plunger 12 is provided with a transverse hole 12a of diameter preferably similar to that of the openings 9a and 9b of the pipe 9 into the bottom and top, respectively, of the casing 11a. Furthermore the plunger 12 is provided on its bottom with a flat surface portion 12b which forms a space 13 with the bottom of the casing 11a; this flat surface begins at a point rearward of the rear side of hole 12a and extends rearwardly from this point by an amount somewhat in excess of the intended range of movement of the plunger within the casing. Slightly to the rear of the pipe 9, and in a position which for any position of the plunger within its normal range of movement is intermediate the extremities of the flat surface 12b, the bottom of the casing is provided with an outlet vent 11c.

The intended range of movement of the plunger 12 is illustrated in the group of figures comprising Figures 3, 1 and 2. The most rearward position is shown in Figure 3, wherein the hole 12a is in substantial alignment with the pipe openings 9a and 9b. Obviously with the plunger in this position, or in any nearby one in which the pipe openings are even partially connected with the hole 12a and the opening 9a at the same time disconnected from the space 13, the suction chamber 1e is connected only with the source of suction (through the hole 12a) and a vacuum is created in the chamber. Such positions of the plunger are conveniently termed "evacuating" positions.

As the plunger is moved forward it will quickly reach the position shown in Figure 1. Herein the plunger portion 12c lying between the hole 12a and the flat surface 12b is completely covering the hole 9a, the hole 9b at the same time being covered by the plunger. Accordingly with the plunger in this particular position the suction chamber 1e is disconnected both from the suction source and from the space 13.

As the plunger is moved still further forwardly the flat surface 12 will almost immediately begin to uncover the pipe opening 9a to the space 13; and by virtue of the vent 11c atmospheric pressure will be admitted to the suction chamber 1e through the space 13 and the opening 9a—i. e., any vacuum which may then exist in the chamber 1e will be discharged and the piston 2 permitted to respond solely to the force of the biasing means 6c. Positions wherein the opening 9a communicates with space 13 may be termed "discharging" positions; such a position is illustrated in Figure 2.

Conventionally the plunger is directly connected with the accelerator pedal of the vehicle for movement at all times therewith, being arranged to occupy the evacuating position when no foot pressure is applied to the accelerator; suction is then applied to the suction chamber 1e and the piston 2 moved forwardly and the clutch disengaged. As the accelerator pedal is depressed from its upmost position the plunger is moved forwardly and comes quickly into a discharging position; the vacuum is then discharged from the chamber 1e and the clutch engaged. The engagement persists until the accelerator pedal is again relieved of foot pressure, whereupon disengagement of course again occurs. This completes the description of the conventional automatic clutch system with which my invention has been illustrated; and it will hereinafter be obvious that the described structure may be vastly modified and/or elaborated upon without affecting the application thereto or co-operation therewith of the novel features of my invention.

According to my invention the range of movement of the plunger is limited, preferably to the minimum which will embrace satisfactory evacuating and discharging positions. The plunger is connected with the accelerator pedal, but not directly in the sense of invariable movement with that pedal; instead the plunger is so connected with the pedal that the first portion of re-directed substantial pedal movement (e. g., movement in the opposite direction from that last effected) will move the plunger from its position at or near one of its movement limits to its other movement limit. Of course further pedal movement must not be interfered with; accordingly I may employ for the plunger-to-pedal connection a yieldable one, which causes plunger movement with pedal movement until the plunger reaches a limiting position but which thereafter permits continued pedal movement in the same direction without plunger movement. Further the connection is non-resilient, in that it is not self-restorative. Thus, having been forced, by continued pedal movement after plunger stoppage, to yield and thus to establish a new plunger-to-pedal relationship, the connection will not of its own accord restore the original plunger-to-pedal relationship—i. e., it will maintain any particular such relationship until further forced to yield in the direction of the last yielding or until forced to yield in the opposite direction.

In Figure 1 a typical such connection has been illustrated. The plunger 12 is provided with the rearwardly extending portion 12e of reduced diameter. Surrounding this portion is a collar or bushing 61, the hole 61a in the bushing through which the plunger portion 12e passes being of larger diameter than that plunger portion. The bushing is maintained in frictional contact with the plunger portion by the leaf spring 62 which extends through the hole 61a alongside of the plunger portion, for example pressing at its longitudinal center against the plunger portion and near its respective extremities against the wall of the bushing hole 61a. The extremities 62a and 62b of the spring 62 may be folded over away from the plunger portion 12e and against the respective extremities of the bushing 61 to secure the spring longitudinally in the bushing. The spring 62 is made of sufficient tension so that movement of the bushing (in the direction of the plunger axis) will move the plunger within the casing 11a, in the absence of impingement of the plunger against either of its limiting means.

The plunger limiting means as to forward movement is a forward end 11d provided in the casing 11a, the end 11d being desirably provided with an aperture 11e to prevent the pocketing of air therein. The end 11d is so positioned that it permits only sufficient forward plunger movement to bring the plunger into a dependable discharging position—such for example as that shown in Figure 2 wherein at least half of the pipe opening 9a is in communication with the space 13 and therethrough with the vent 11c. The plunger limiting means as to rearward movement is the upper arm 63a of a lever 63 hereinafter referred to, this lever arm being positioned in the path of rearward movement of the plunger portion 12e. Normally this arm is so positioned that the plunger can move rearwardly only to the position illustrated in Figure 1, wherein the plunger portion 12c (between the hole 12a and the flat surface portion 12b) completely covers the pipe opening 9a. The arm 63a may, however, be moved as hereinafter described slightly rearwardly so as to permit the plunger to reach its evacuating position illustrated in Figure 3 and above described.

Attention is here invited to the desirability of making the longitudinal dimension of the plunger portion 12c the minimum which will effectively cover the pipe opening 9a and prevent significant air passage therethrough. For convenience in further description the position of the plunger 12 when its portion 12c so covers the pipe opening (i. e., the position illustrated in Figure 1) may be termed a "maintaining" position, in that it permits no significant air passage to or from the suction chamber 1e, and therefore maintains in that chamber whatever pressure condition existed therein immediately prior to the attainment by the plunger of the maintaining position. This statement must of course be qualified to the extent of such small leakage effects as may take place, for example about the piston 2; these of course can be of even theoretical significance only when a vacuum exists in the suction chamber, and even then are of such slow action with reasonably good construction of the components that they have been found to have no deleterious effect on the operation of the system.

The yieldable, non-resilient connection of the plunger to the accelerator pedal is completed by a simple connection of the bushing 61 to that pedal, which may be identified as 13 in Figure 1. In accordance with frequent practise, the pedal 13 has been shown as augmented by a foot-piece 14, pivotally supported to the floor-board 15 as by the spring hinge 14a which very, very lightly biases the foot-piece 14 against the pedal 13. The pedal has been shown as forming the upper extremity of a pedal post or rod 13a, which extends downwardly and forwardly from the pedal through a hole 15b in the floor-board to be pivotally secured to an intermediate point 64a on the arm 64. This arm is pivotally supported at its upper extremity to a suitable fixed member, such as bracket 65 extending forwardly from the dash-board 15a. The lower extremity of the arm 64 engages an elongated vertical slot 61c in an upward extension 61b formed from the bushing 61. It will therefore be apparent that movement of the accelerator pedal 13 will produce corresponding movement of the bushing 61, and vice versa. A tension spring 66 connected between the arm 64 and the floor-board may serve to bias the arm 64 to counter-clockwise rotation, the accelerator pedal 13 to upward movement, and the bushing 61 to rearward movement. Rearward movement of the bushing 61 is limited by the rearward movement limit of the plunger 12, by virtue of a collar 60 secured about the plunger portion 12e to the rear of the bushing 61; the rearward bushing movement limit in turn provides a limit of counter-clockwise movement of arm 64, and of upward accelerator pedal movement.

The accelerator pedal may be arranged to control the fuel inflow to the motor in the following manner: The bracket 65 is provided at its forward extremity with a folded-over and downhanging apron 65a, having a hole near its lower extremity. Freely through this hole passes a rod 19 connected to the conventional throttle valve for regulating fuel inflow (not shown). The rod 19 terminates in a rounded head 19a positioned in the path of movement of the arm 64. A compression spring 22 encircling the rod 19 between the apron 65a and the head 19a biases the head into contact with the arm 64; and the head 19a will at all times preserve such contact, excepting as limited by a collar 23 secured about the rod 19 forward of the apron 65a. The collar 23 is so positioned as to permit contact of the head 19a with the arm 64 for all positions of that arm to and just including that illustrated in Figure 1, wherein the bushing 61 is in the most rearward position relative to the plunger which is permitted by the collar 60, and the plunger 12 is in the most rearward position normally permitted by the lever arm 63a. With the arm 64 in the position of Figure 1, the rod 19 then occupying its most rearward position, the throttle valve is adjusted to provide minimum fuel inflow to the motor. Even though arm 64 swing on occasion more counter-clockwise than in Figure 1, the rod 19 will be prevented by the collar 23 from further rearward movement, and the minimum fuel inflow will remain undisturbed.

The normal position of the lever arm 63a has been shown to limit counterclockwise rotation of arm 64, and to limit rearward movement of the plunger 12 to the maintaining position shown in Figure 1. Accordingly the lever 63 may be termed a means for limiting the range of adjustment of the valve 11 and of the range of movement of the accelerator pedal 13. Lever 63 may, however, be rotated clockwise by a slight amount about its fixed pivot point 63c so as to produce slight rearward movement of the arm 63a. This movement of arm 63a causes arm 64 and bushing 61 to move rearwardly by virtue of spring 66, carrying the plunger 12 rearwardly to its evacuating position and causing a slight rise of the accelerator pedal 13—assuming of course no foot pressure on the latter. The means for producing the slight clockwise rotation of lever 63—i. e., for releasing the limiting means comprised by the lever—may now be described.

From the transmission 8 there may extend upwardly through the floor-board 15 the truncated conical casing 8a, and outwardly through the top of this casing may pass the transmission adjusting rod 8b. This rod will be understood to be in effect pivoted for both slight sideward and slight front-and-back movement at some point P₃ within the casing 8a, the function of moving the rod about its pivot being the adjustment of the transmission ratio. Extending upwardly and rearwardly from the rod 8b wherewith to move the rod is the transmission control means—e. g., the gear shift lever—which in its entirety is designated as 8c. In this transmission control means I include means for releasing the limiting means comprised by lever 63 and above discussed.

The main portion of this transmission control means 8c may be a thin cylinder 30 secured at its lower and forward extremity to the rod 8b and having its upper extremity very approximately in a suitable position for grasping by the operator of the vehicle. Slidably fitting within the cylinder 30 is a rod 29, which may be splined within the cylinder by the screw 32 threaded into the rod and operating in a limited longitudinal slot 33 in the cylinder (as appears more clearly in the detail Figure 1a). The rod 29 may extend outwardly from the rear, upper extremity of the cylinder 30 to terminate at a little distance therefrom in a knob 29b suitably and conveniently positioned for grasping by the operator. Between the knob and the cylinder there may encircle the rod 29 a light expansion spring 31 of sufficient force to bias the rod 29 to upward movement within the cylinder. This movement may be limited by a collar 34 adjustably secured about the rod 29 at the opposite end of the cylinder 30. The rod 29 may extend from the latter end of the cylinder downwardly and forwardly through an enlarged aperture 15c in the floor-board, and may terminate in a cam member 28. The forward surface 28a of this cam member is spherical, and has as its effective center the pivot point P₃ abovementioned.

The lower portion 63b of the lever 63 may extend downwardly and sufficiently transversely of the vehicle to be intercepted by the axis of rod 29; it is biased rearwardly as by tension spring 26 running therefrom to the floor-board. The collar 34 may be secured on the rod 29 in such a position that it is in contact with the lower and forward extremity of the cylinder 30 when the cam 28 has pushed the lower lever portion 63b into such a position that the lever arm 63a limits the plunger position to the maintaining position, as shown in Figure 1. The collar 34 thus may be employed as a means for nicely establishing the normal position of the lever arm 63a. If now the knob 29b and rod 29 be slightly depressed by the operator, the cam surface 28a will be moved forwardly and will in turn move forwardly the lower lever portion 63b and move rearwardly the lever arm 63a. This removes the limitation normally imposed by the lever 63 upon rearward movement of the plunger 12, etc., and permits the plunger to come into its evacuating position.

A few details may be noted. As to cam 28, rotation of rod 29 about its own axis, which would shift the effective center of the spherical surface, is prevented by the splining of rod 29 to cylinder 30 abovementioned. Further as to the cam, its surface 28a is intended to be spherical about the point P₃ as a center when the rod 29 occupies its upward position; but because the rod 29 is never moved downwardly from this position excepting by a very small distance, the cam surface remains at all times substantially in accordance with the abovementioned specification as to its effective center. The rod 8b is of course subjected in adjustment of the transmission to some rotation about its effective pivot point P₃; but the formation of the cam surface with the point P₃ as its effective center precludes this rotation of the rod 8b from moving the lever 63. As to the various springs, it has already been noted that leaf spring 62 must be of sufficient force to cause plunger 12 to move with bushing 61 excepting as prevented by its limiting means. Spring 66 should be of sufficient tension to cause arm 64 to move bushing 61 rearwardly along the plunger portion 12e, overcoming the friction produced by leaf spring 62, whenever the accelerator pedal is released with the plunger at a limiting rearward position but with the bushing 61 not in contact with the collar 60. The spring 22 need be of only sufficient expanding force to overcome frictional effects in the system formed by rod 19 and the throttle valve. Spring 26 must have sufficient tension so that in the region of mutual influence of that spring and spring 66—i. e., at the point of contact of plunger portion 12e and lever arm 63a— the force of spring 26 definitely predominates. Finally, the position of the bottom extremity of the slot 33 may be so chosen as to limit downward movement of the rod 29 to a position appropriate to the occupation by the plunger 12 of a satisfactory evacuating position.

The structure having been thus described, attention may be directed to the manner of operation. Figure 1 illustrates the normal positions of the components when no foot pressure is applied to the accelerator pedal. The bushing 61 is in contact with the collar 60 and forces the plunger 12 against the lever arm 63a—i. e., to its maintaining position. Let it be assumed that the clutch is engaged and that the transmission control is adjusted to "neutral". It is now desired to adjust the transmission control to low gear and to start the vehicle. The operator depresses knob 29b as shown in Figure 4; the lever 63 is rotated slightly clockwise, and spring 66 moves bushing 61 and plunger 12 rearwardly—the latter to its evacuating position. Forthwith suction is applied to the suction chamber 1e, and the piston 2 moves forwardly and the clutch disengages. The operator may now if desired release the downward pressure on the knob 29b, since the effect of this will be merely to return the plunger to the maintaining position of Figure 1, in which the vacuum in chamber 1e and the disengaged condition of the clutch will be maintained for the considerable time permitted by any slow leakage effects. Without the necessity of removing his hand from the knob 29b the operator may move the gear shift lever 8c into low gear adjustment. Foot pressure is now applied to the accelerator pedal and the arm 64 thus rotated clockwise, moving the rod 19 (and thus feeding fuel to the motor) and moving forwardly the bushing 61. In the first small portion of this forward bushing movement the plunger 12 will move coincidentally with the bushing, so that the plunger comes quickly into a discharging position. Forthwith the vacuum in chamber 1e begins discharging, and the piston 2 moves rearwardly and the clutch engages. The forward movement of the bushing 61 following the first small movement portion is unaccompanied by any further forward movement of the plunger 12, which is stopped by virtue of the casing end 11d. A typical position to which the movements of the components may extend is illustrated in Figure 2, wherein bushing 61 has moved along plunger portion 12e to a position materially forward of the collar 60.

Let it be now assumed that the operator desires to shift his transmission control into second gear. He will press downwardly the knob 29b and coincidentally release the foot pressure on the accelerator. In response to spring 66 the arm 64 will rotate counter-clockwise, moving rearwardly the bushing 61. In the first small portion of this rearward bushing movement the plunger 12 will move rearwardly and (by virtue of the downward pressure on knob 29b and consequent forward position of lever arm 63a) will come quickly into its evacuating position. Forthwith suction is applied to the chamber 1e, and the piston 2 moves forwardly and the clutch disengages; clutch disengagement is accordingly effected in the early portion of the de-accelerating process, before bushing 61 has moved rearwardly to any great extent and hence before the fuel inflow to the motor has been appreciably reduced. The rearward movement of the bushing 61 following the first small movement portion is unaccompanied by any further rearward movement of the plunger 12, which is stopped by virtue of the lever arm 63a. A typical position of the components at an intermediate instant in the de-accelerating process—i. e., the rise of the accelerator pedal 13—is illustrated in Figure 3, wherein the bushing 61 has partially moved rearwardly along the plunger portion 12e toward the collar 60.

Figure 4 illustrates the extreme position to which the accelerator pedal rises and the rearward bushing movement may proceed if the operator maintains downward pressure on the knob 29b. He need, however, maintain this pressure only until clutch disengagement occurs, and may immediately thereupon or as soon thereafter as desired release the downward pressure on the knob and by the knob move the gear shift lever 8c to second gear adjustment. Having effected this transmission readjustment he will again accelerate by downward pressure on the pedal 13, and the operation as outlined for acceleration in low gear will be repeated. And the process of shifting from any gear to any other gear may comprise a repetition of the operations as outlined for the shift from low to second gear.

Broadly, the clutch may be automatically disengaged at any time by combined pressure on the knob 29b and slight de-acceleration, the plunger 12 always accompanying the bushing 61 in its early rearward movement and requiring only a short rearward displacement from its most forward position to reach its evacuating position. And if de-acceleration is being effected for purposes other than transmission readjustment, and continued clutch engagement desired for the braking effect of the motor, the operator will simply avoid pressing downwardly the knob 29b, which he then indeed has no particular occasion to touch at all; the plunger 12 can then come only into its maintaining position, wherein of course it maintains indefinitely the previously existing condition of clutch engagement.

Because of its action to produce clutch disengagement at an early instant in de-acceleration, the yieldable, non-resilient connection of valve 11 to the accelerator pedal, if unaccompanied by the auxiliary control comprised by knob 29b, would increase the times during which the braking effect of the motor would be lost. In combination with the auxiliary control, however, it provides at the times when desired a quick clutch disengagement and freedom from "dragging" of the vehicle by the motor, while in no way interfering with the braking action of the motor when that is desired.

It will be noted that while pressure on the knob 29b is one of the requisites for automatic clutch disengagement, the converse of that proposition is not true—i. e., clutch engagement will occur in response to acceleration alone. Thus should the operator maintain downward pressure on the knob 29b not only during the de-accelerating process but, unnecessarily, also into the ensuing accelerating process, he will not thereby interfere with the clutch re-engagement.

In the described embodiment of my invention, illustrated in Figures 1 through 4, the lever 63 forms a means for normally limiting the range of adjustment of the the valve 11, this limiting means being released to permit clutch disengagement at appropriate times by a mechanical system carried by the transmission adjusting means and comprising the cam 28, rod 29 and control knob 29b. In Figure 5 I illustrate a second embodiment of my invention from which I omit the limiting means and mechanical releasing system just mentioned, and in substitution therefor employ a suction control device distinct from and in series with the valve 11, this device normally limiting or preventing the application of suction to the chamber 1e but being releasable to permit such suction application by manipulation of an appropriate releasing means. This releasing means may be a knob similarly positioned and similarly manipulable to the knob 29b of the first embodiment. As to fundamental operational principles the cooperation of the distinct suction control device and its releasing knob with the other features of my invention is quite similar to the co-operation with those features of the limiting means and releasing system therefor of the first embodiment; and the manner of manipulation of the controls by the operator of the vehicle is entirely similar to that above described.

In Figure 5 the distinct suction control device which I employ is illustrated as a valve 40, which is normally closed but is open by inward pressure on its stem 40b. A cross-sectional view of a typical valve 40 appears as Figure 5a; this illustrates the valve in its normal condition—i. e., closed at 40x. The transmission adjusting rod 8b is shown in Figure 5 as extended upwardly and rearwardly by the conventional portion 8b', threaded at its outer extremity. A block 41 is secured to the rod portion 8b' near the lower end of that portion, being for example provided with a hole approximately fitting the rod, cut through the axis of the hole as along the line 41a, and its two parts clamped about the rod by the screws 41b. Into this block in any convenient manner is secured the base 40a of the valve 40, so that the stem 40b of the valve is directed upwardly and rearwardly substantially parallel with the rod portion 8b'; as illustrated the axis of the valve stem 40b is disposed above and somewhat transversely of the vehicle from that rod portion. The valve stem 40b is effectively extended, as by the extension rod 40c and the bushing 40d connecting stem and extension rod. Onto the outer extremity of the rod portion 8b' is screwed, and locked by nut 42b, a block 42 which is provided with a hole parallel with and at a slight distance from the rod portion 8b'. The extension rod 40c passes freely through this hole to terminate a slight distance therebeyond in a knob 40e. A compression spring 40f may encircle the extension rod 40c between the block 42 and the knob 40e, whereby to bias the knob 40e upwardly and thus to maintain the valve 40 closed in the absence of pressure on the knob. The hose 10 from pipe 9 to the suction source is broken and its two portions connected through the valve 40, so that the latter controls the transmission of suction through the hose. A bracket 69 is secured to the floorboard 15 and extends into the path of movement of the plunger portion 12e, being so positioned as to limit the rearward movement of the plunger to the position to which it was limited in the first embodiment by the lever 63 when knob 29b was depressed—i. e., to the evacuating position as in Figures 3 and 4.

Of course as foot pressure is removed from the accelerator pedal in the embodiment of Figure 5, that pedal, the arm 64, the bushing 61, and the plunger 12 will not be limited to the positions shown and described for Figure 1 above, but may move further to the positions shown and described for Figure 4; this is irrespective of the position of the knob 40e. But when that knob occupies its normal or upward position (as in Figure 5) and the valve 40 is therefore closed, occupation of the Figure 4 positions by the pedal, arm, bushing and plunger is functionally no different from the occupation of Figure 1 positions by these parts. Thus in the first embodiment only when knob pressure was exerted was the plunger permitted to assume its evacuating position; in the second embodiment, while the plunger movement is not similarly limited, yet it is only when knob pressure is exerted that the evacuating position of the plunger is permitted to be of significance. Obviously, of course, the benefits of the yieldable, non-resilient connection of valve 11 to the accelerator pedal 13 are retained in the second embodiment.

In both embodiments I have shown the supply of suction to the chamber 1e as normally suppressed: in the second embodiment by the valve 40, and in the first embodiment by the lever 63, which normally prevents the plunger 12 from reaching an evacuating position. It will further be seen that in each embodiment the particular suppressing means employed is released by depression of the knob on the gear shift lever 8c. I prefer, of course, to include this releasing means in the transmission control system as shown, so that it will be operated as an intuitive incident to transmission readjustment. Even though the releasing means be not limited to this particular location, however, utility remains in the combination of the yieldable, non-resilient valve-to-pedal connection (or structure performing its function) with the normally operative suppressing means and releasing means therefor operable at will.

It will be obvious that my invention may be carried out with structures considerably modified in one or another respect from those described in detail herein, and that such modified structures may properly fall within the scope of the invention. In the claims hereto appended I undertake to express the scope of the invention, and of all the various novel combinations and features thereof, as broadly as the state of the art will permit.

In both the embodiments of my invention the collar 60, secured about the plunger portion 12e, forms a means for limiting counter-clockwise rotation of arm 64 in response to the biasing means 66, and hence for limiting the accelerator pedal rise. While such a limitation might be otherwise provided than by a member secured to the movable plunger, the arrangement disclosed has the following particular advantage in the case of the first embodiment:

Let the parts be assumed in their normal positions with no foot pressure on the accelerator pedal (as illustrated in Figure 1), and that it is desired to disengage the clutch. The depression of knob 29b removes the limitation of rearward plunger movement and permits the plunger to come into its evacuating position; but the force which actually causes the plunger to move rearwardly is the force of the pedal biasing means 66, operating on the collar 60. If there were employed in place of collar 60 a limiting means not secured to the plunger 12, the spring 66 would by that limiting means be rendered inoperative to move the plunger into the evacuating position. In turn to counteract this deficiency the complication of additional plunger biasing means, with nice adjustment of its force relative to the forces of the disclosed biasing means, would be required. It will be appreciated, however, that the mentioned failure of the plunger to come into evacuating position would be peculiar not only to the first embodiment, but further to those particular cases in the operation of that embodiment in which the knob 29b was depressed in the absence of foot pressure on the accelerator pedal, i. e., after de-acceleration was completed.

I claim:—

1. In combination in a motor vehicle having a clutch: a pedal movable to effect motor acceleration and de-acceleration, and means, connected with said clutch and responsive to small initial de-accelerating movements of said pedal in all portions of the pedal movement range, for disengaging said clutch.

2. In combination in a motor vehicle having a clutch: a member movable to effect motor acceleration and de-acceleration, and means, connected with said clutch and responsive to relatively small de-accelerating movements of said member from any position within a substantial portion of its movement range, for disengaging said clutch.

3. In combination in a motor vehicle having a clutch: a member movable to effect motor acceleration and de-acceleration; means, connected with said clutch and responsive to relatively small de-accelerating movements of said member from any position within a substantial portion of its movement range, for disengaging said clutch; and means, releasable at will, for normally suppressing the response of said disengaging means.

4. In combination in a motor vehicle having a clutch and a transmission: a member movable to effect motor acceleration and de-acceleration; means, connected with said clutch and responsive to relatively small de-accelerating movements of said member from any position within a substantial portion of its movement range, for disengaging said clutch; transmission control means; means for normally suppressing the response of said disengaging means; and means, associated with said transmission control means for operation therewith, for releasing said response suppression.

5. In combination in a motor vehicle having a clutch arranged to assume engaged and disengaged conditions: a pedal movable to effect motor acceleration and de-acceleration, and means, connected with said clutch and responsive to small initial re-directed movements of said pedal in all portions of the pedal movement range, for reversing the condition of said clutch.

6. In combination in a motor vehicle having a clutch arranged to assume engaged and disengaged conditions: a member movable to effect motor acceleration and de-acceleration, and means, connected with said clutch and responsive to relatively small re-directed movements of said member from any position within a substantial portion of its movement range, for reversing the condition of said clutch.

7. In combination in a motor vehicle having a clutch arranged to assume engaged and disengaged conditions: a member movable to effect motor acceleration and de-acceleration; means, connected with said clutch and responsive to relatively small re-directed movements of said member from any position within a substantial portion of its movement range, for reversing the condition of said clutch; and means, releasable at will, for normally suppressing clutch disengaging response of said reversing means.

8. In combination in a motor vehicle having a clutch arranged to assume engaged and disengaged conditions, and a transmission: a member movable to effect motor acceleration and de-acceleration; means, connected with said clutch and responsive to relatively small re-directed movements of said member from any position within a substantial portion of its movement range, for reversing the condition of said clutch; means for normally suppressing clutch disengaging response of said reversing means; transmission control means; and means, associated with said transmission control means for operation therewith, for releasing said response suppression.

9. In combination in a motor vehicle having a clutch and a clutch operating device: a pedal movable to effect motor acceleration and de-acceleration; means for controlling said device including a limitedly movable member connected with said pedal for movement thereby; and yielding means interposed between said pedal and said member, said yielding means being adapted for operation only when further movement of said member is blocked.

10. In combination in a motor vehicle having a clutch and a clutch operating device; bidirectionally but limitedly movable control means for said device; bidirectionally movable motor control means; and means responsive to the initial portion of each re-directed substantial motor control means movement, for moving said device control means to a respective extremity of its movement range.

11. In combination in a motor vehicle having a clutch and a clutch operating device: bidirectionally but limitedly movable control means for said device; bidirectionally movable motor control means; and means responsive to the initial portion of each re-directed substantial motor control means movement, for moving said device control means to a respective extremity of its movement range, comprising a yieldable but non-resilient connection between said two control means.

12. In combination in a motor vehicle having a clutch and a clutch operating device; bidirectionally but limitedly movable control means for said device; bidirectionally movable motor control means; and means responsive to the initial portion of each re-directed substantial motor control means movement, for moving said device control means to a respective extremity of its movement range, comprising a frictional connection between said two control means.

13. In combination in a motor vehicle having a clutch and a clutch operating device: bidirectionally but limitedly movable control means for said device; bidirectionally movable motor control means; a frictional connection between said two control means; and means biasing said motor control means to movement in one direction, said biasing means being of sufficient strength to overcome the friction of said connection when further movement of said device control means is blocked.

14. In combination in a motor vehicle having a clutch and a power actuated device for operating said clutch: bidirectionally but limitedly movable power device control means; bidirectionally movable motor control means; means responsive to the initial portion of each re-directed substantial motor control means movement, for moving said device control means to a respective extremity of its movement range; means normally suppressing the supply of power to said device; and means operable at will to release said power supply suppression.

15. In combination in a motor vehicle having a clutch, a power actuated device for operating said clutch, and a transmission: bidirectionally but limitedly movable power device control means; bidirectionally movable motor control means; means responsive to the initial portion of each re-directed substantial motor control means movement, for moving said device control means to a respective extremity of its movement range; means normally suppressing the supply of power to said power device; transmission control means; and means, associated with said transmission control means for operation therewith, for releasing said power supply suppression.

16. In combination in a motor vehicle having a clutch and a clutch operating device: bidirectionally but limitedly movable control means for said device; bidirectionally movable motor control means; means responsive to the initial portion of each re-directed substantial motor control means movement, for moving said device control means to a respective extremity of its movement range; and means operable at will to alter said range of limited movement of said device control means.

17. In combination in a motor vehicle having a clutch, and a clutch operating device, and a transmission: bidirectionally but limitedly movable control means for said device; bidirectionally movable motor control means; means responsive to the initial portion of each re-directed substantial motor control means movement, for moving said device control means to a respective extremity of its movement range; transmission control means; and means, associated with said transmission control means for operation therewith, for altering said range of limited movement of said device control means.

18. In combination in a motor vehicle having a clutch and a clutch operating device: bidirectionally movable control means for said device adapted for movement only to clutch disengaging, clutch condition maintaining, and clutch engaging positions; bidirectionally movable motor control means; means responsive to the initial portion of each re-directed substantial motor control means movement, for moving said device control means to a respective extremity of its movement range; means normally restricting said range of movement of said device control means to said clutch engaging and clutch condition maintaining positions only; and means operable at will to release said range restriction.

19. In combination in a motor vehicle having a clutch, a clutch operating device, and a transmission: bidirectionally movable control means for said device adapted for movement only to clutch disengaging, clutch condition maintaining, and clutch engaging positions; bidirectionally movable motor control means; means responsive to the initial portion of each re-directed substantial motor control means movement, for moving said device control means to a respective extremity of its movement range; means normally restricting said range of movement of said device control means to said clutch engaging and clutch condition maintaining positions only; transmission control means; and means, associated with said transmission control means for operation therewith for releasing said range restriction.

20. The combination according to claim 9, further including means for biasing said pedal to movement in one direction; and means for limiting such movement, comprising a stop carried by said member.

CHARLES T. JACOBS.